United States Patent
Oosumi

[11] Patent Number: 5,976,708
[45] Date of Patent: *Nov. 2, 1999

[54] HEAT RESISTANT STAINLESS STEEL WIRE

[75] Inventor: Kazuo Oosumi, Kanagawa, Japan

[73] Assignee: Isuzu Ceramics Research Institute Co., Ltd., Fujisawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/742,925

[22] Filed: Nov. 1, 1996

[30] Foreign Application Priority Data

| Nov. 6, 1995 | [JP] | Japan | 7-313554 |
| Jan. 29, 1996 | [JP] | Japan | 8-034387 |

[51] Int. Cl.$^6$ .............. B32B 15/16; C22C 1/05; F23Q 7/00; H05B 3/12
[52] U.S. Cl. .......... 428/563; 428/553; 428/559; 428/562; 428/564; 428/629; 428/685; 428/607
[58] Field of Search .................. 428/548, 615, 428/650, 652, 653, 654, 681, 682, 684, 685, 688, 689, 629, 632, 553, 563, 564, 562, 559, 607; 174/102 R, 126.1, 126.2

[56] References Cited

U.S. PATENT DOCUMENTS

| 2,934,670 | 4/1960 | Gingrande | 313/344 |
| 3,907,708 | 9/1975 | Lacroix | 252/439 |
| 4,141,760 | 2/1979 | Baldi | 148/31.5 |
| 4,292,208 | 9/1981 | Baldi | 252/470 |
| 4,655,852 | 4/1987 | Rallis | 148/6.11 |
| 4,797,329 | 1/1989 | Kilbane et al. | 428/623 |
| 4,885,215 | 12/1989 | Yoshioka et al. | 428/632 |
| 4,897,317 | 1/1990 | Kanamaru et al. | 428/629 |
| 4,977,036 | 12/1990 | Baldi | 428/553 |
| 5,066,549 | 11/1991 | Kilbane et al. | 428/653 |
| 5,077,257 | 12/1991 | Baldi | 502/301 |
| 5,182,078 | 1/1993 | Baldi | 419/9 |
| 5,262,033 | 11/1993 | Zega | 204/298.37 |
| 5,372,886 | 12/1994 | Inazawa et al. | 428/384 |

FOREIGN PATENT DOCUMENTS

| 0 475 427 | 3/1992 | European Pat. Off. |
| 0 673 493 | 9/1995 | European Pat. Off. |
| 55-110830 | 8/1980 | Japan |
| 58-140411 | 8/1983 | Japan |
| 60-000216 | 5/1985 | Japan |
| 287407A | 11/1993 | Japan |
| 6-241450 | 8/1994 | Japan |
| 7-019473 | 1/1995 | Japan |

*Primary Examiner*—John J. Zimmerman
*Attorney, Agent, or Firm*—Staas & Halsey

[57] ABSTRACT

The heat resistant stainless steel wire/strip comprises a stainless steel thin wire/strip containing, in addition to chrome, at least one of nickel, aluminum and yttrium. The stainless steel thin wire/strip is covered with a covering layer formed of nickel group alloy particles containing aluminum covered with ceramic particles or chrome alloy particles containing aluminum covered with ceramic particles. The stainless steel thin wire/strip with the covering layer is applied with heat treatment in vacuum at a temperature of 1100 to 1300° C., the alloy particles are deposited on the stainless steel thin wire/strip, and the alloy particles and the ceramic particles of the covering layer are bonded to each other. The ceramic particles of the covering layer is 1 micron or less of an average particle diameter and contain at least one of aluminum, silicone, magnesium, zirconium, barium and titanium.

2 Claims, 7 Drawing Sheets

HEAT RESISTANT STAINLESS STEEL WIRE

BACKGROUND OF THE INVENTION

The present invention relates to heat resistant stainless steel wire and/or heat resistant stainless steel strip for an electric heater as used in a preheating plug for a Diesel engine, and particularly to heat resistant stainless steel wire and/or heat resistant stainless steel strip in which the bonding forces of a covering layer relative to substrate steel wire are strong.

Methods for applying a ceramic-metal composite covering to the surface of a based material or a substrate metal so far known include a Chemical Vapor Deposition (CVD) method, a Physical Vapor Deposition (PVD) method, a Solgel method, a flame coating and the like.

However, in the CVD method, materials for substrate metal and a covering matter are restricted, and in the PVD method, the bonding force of adhesion force between substrate metal and a covering matter is weak. Further, also in the Solgel method, the bonding force or adhesion force between the substrate metal and the covering matter is weak, and it is difficult to form a thick covering layer whose thickness exceeds 1 micron. Particularly, it is necessary to form fine rugged portions on the surface of substrate metal by the shot blast or the like before bonding the covering matter. It is therefore very difficult to form a covering layer on metal parts such as a thin wire, a thin sheet, small articles, etc.

Japanese Patent Application Laid-Open No. 287407/1993 discloses an example in which alloy powder such as nickel alloy, cobalt alloy, etc. is placed in firm contact with the surface of ceramic powder such as relatively coarse silicon nitride, alumina, etc. as ceramic based powder for metallurgy for covering the surface of substrate metal such as a machining tool. However, such substrate metals are insufficient in mechanical strength, and uses thereof are limited.

On the other hand, a stainless steel covered with aluminum by melt plating to enhance heat resistant ability has been heretofore put to practical use. However, in a stainless steel thin wire and a stainless steel sheet covered with aluminum by melt plating, an aluminum alloy layer obtained by melt plating is brittle, and stainless steel as a substrate metal becomes brittle at a high temperature. Likewise, an aluminum alloy layer obtained by diffusion treatment is also brittle, and the alloy layer is peeled off from the stainless steel wire as a based material or a substrate metal at a high temperature, and the substrate metal also becomes brittle.

SUMMARY OF THE INVENTION

In view of the aforementioned problems, the object of the present invention is to provide a heat resistant stainless steel wire which has a strong bonding force of a covering layer relative to the substrate metal.

The another object of the present invention is to provide a heat resistant stainless steel wire in which a strong intermediate layer is formed between an aluminum covering layer and a substrate metal to thereby enhance the heat resistance and the durability.

For solving the aforementioned problem, the present invention provides a heat resistant stainless steel wire characterized in that the surface of steel thin wire containing chromium (Cr) is covered with a covering layer formed of nickel (Ni) group alloy particles containing aluminum (Al) covered with ceramic particles or chromium (Cr) group alloy particles containing aluminum (Al) covered with ceramic particles, said alloy particles being deposited to said steel thin wire.

Further, the present invention provides a heat resistant stainless steel wire characterized in that a first layer comprising aluminum and an iron-aluminum alloy is formed on the uppermost surface, a second layer in which an aluminum-iron compound and an aluminum-nickel compound are dispersed into a ferrite based stainless steel mainly comprising iron-chromium is formed as an intermediate layer, and an austenite based stainless steel thin wire being present in a center portion of the heat resistant stainless steel wire.

The present invention is characterized in that the thickness of the first layer is 10 micron or less, and the average diameter of the crystal particle of the second layer is 10 to 30 micron.

The heat resistant steel wire by this invention uses a steel thin wire as the substrate metal, preferably uses a stainless steel thin wire of not only circular section but also thin rectangle section. Therefore, it should be understood that the heat resistant steel wire of the invention includes both circular section and thin rectangle section.

According to the present invention, a mixture of ceramic particle or powder of the which distribution is even and average particle diameter is 1 micron or less and allow particle or powder is adhered to the surface of a steel thin wire, as the substrate metal, by an organic solvent and then heat-treated in vacuum to obtain the heat resistant steel wire. By the heat treatment, the ceramic powder and the alloy powder are reduced by carbon of the organic solvent and deposited on the steel thin wire.

As the substrate metal, steel thin wire containing, in addition to chromium (Cr), at least one of nickel (Ni), aluminum (Al) and yttrium (Y), that is a stainless steel thin wire is. As the ceramic powder, at lest one of aluminum (Al), silicon (Si), magnesium (Mg), zirconium (Zr), barium (Ba) and titanium (Ti) may be selected. More specifically, their oxides such as $Al_2O_3$, $SiO_2$, MgO, $ZrO_2$, $BaTiO_3$, $TiO_2$ etc. are used. As the alloy powder, there can be selected nickel (Ni) based alloy powder containing aluminum (Al) or chrome (Cr) based alloy powder containing aluminum (Al), preferably Ni—Cr—Al alloy powder.

For improving the durable strength of the stainless steel thin wire, the alloy powder of chromium and aluminum is bonded on the surface of the stainless steel thin wire as a substrate metal using an adhesive and then applied with heat treatment for about two hours in vacuum at a temperature of 1100° C. With this, a first layer having 10 micron or less of thickness comprising aluminum and an iron-aluminum alloy is formed on the surface of the stainless steel thin wire, a second layer having 20 micron or more of thickness in which an aluminum-iron compound and an aluminum-nickel compound are dispersed into a ferrite based stainless steel mainly comprising iron-chromium is formed on the intermediate layer, and an austenite based stainless steel thin wire being present in the center portion of the heat resistant steel wire.

According to the present invention, a mixture of ceramic powder and alloy powder was adhered to the surface of substrate metal using an adhesive such as synthetic rubber, after which heat treatment is applied thereto in vacuum whereby obtaining heat resistant stainless steel wire or strip having the large bonding force of a covering layer relative to the substrate metal.

According to the present invention, the chromium-aluminum particles are adhered to the surface of the austenite based stainless steel thin wire or strip and heat-treated to thereby obtain heat resistant stainless steel wire or strip having a ferrite based Fe—Cr—Ni—Al alloy layer on the surface thereof and being excellent in heat resistance and tensile strength.

As a substrate metal having a relatively good processability is used, the heat resistant stainless steel wire or strip according to the present invention poses no problem in plastic working even if the wire diameter or the strip thickness is small.

These and other objects and features of the invention will become more apparent upon a perusal of the following description taken in conjunction with the accompanying drawings wherein:

DESCRIPTION OF THE PREFERRED EMBODIMENTS

First Embodiment

Figure 1:
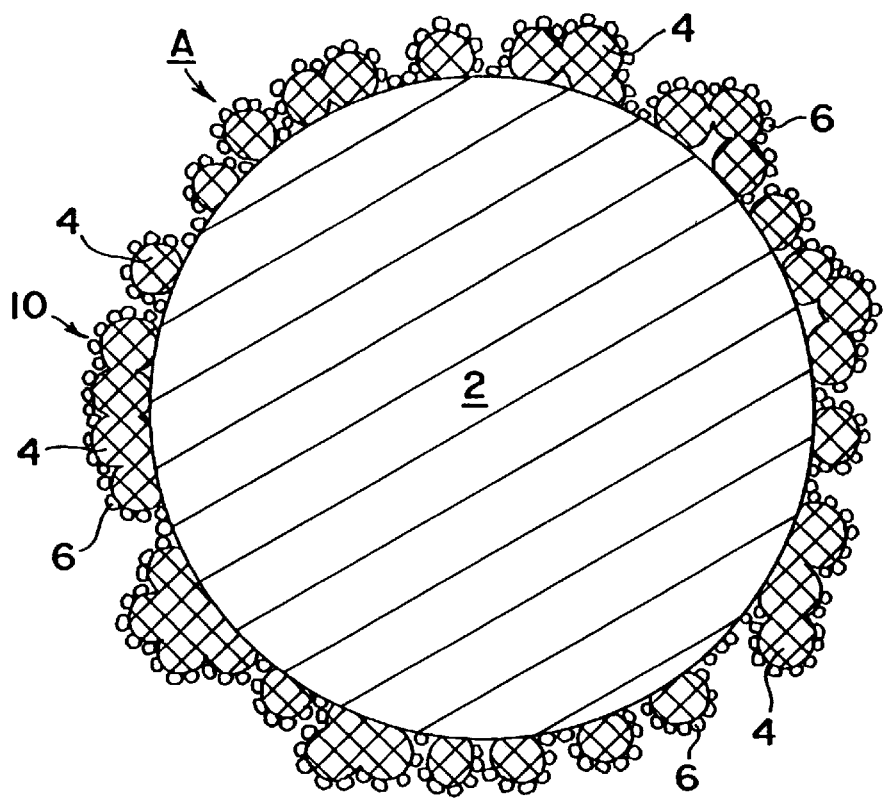
FIG. 1 is a sectional view schematically showing a heat resistant stainless steel wire according to the first embodiment of the present invention.
Figure 2:
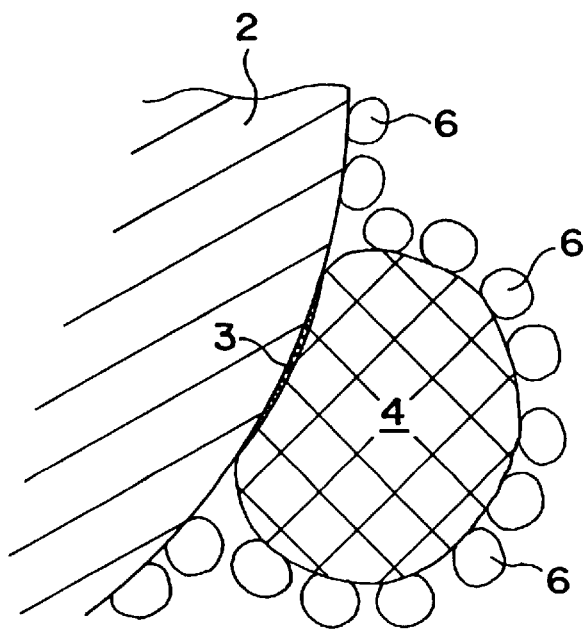
FIG. 2 is a sectional view showing main parts of the heat resistant stainless steel wire.

As shown in FIGS. 1 and 2, a synthetic rubber based adhesive formed from acrylic rubber, an organic solvent, isohexane gas, etc. was coated, by spraying, on the surface of a stainless steel thin wire 2 having a 0.2 mm diameter as the substrate metal. A mixture of Ni—Cr—Al alloy powder 4 of which average particle diameter is 5 to 20 micron and ceramic powder 6 such as $Al_2O_3$, $SiO_2$, MgO, $ZrO_2$, $BaTiO_3$, $TiO_2$, etc. of which average particle diameter is 0.3 to 1.0 micron was adhered to the surface of the adhesive coaged on the surface of the stainless steel thin wire 2. Subsequently, the stainless steel thin wire 2 was heated for about two hours under the vacuum at a temperature of 1100 to 1300° C. to obtain a heat resistant stainless steel wire "A" covered with particulate matter.

The surface of the heat resistant stainless steel wire "A" covered with particulate matter obtained according to the present invention was observed. As a result, the Ni—Cr—Al alloy powder 4 and the ceramic powder 6 for covering the surface of the stainless steel thin wire 2 were adhered while keeping the shape and the particle diameter before being covered, as shown in FIG. 1. The covered particles 4 and 6 of a covering layer 10 of the stainless steel thin wire 2 were not so placed one above the other but were uniformly dispersed into the covering layer 10 as a substantially single layer. The covered particles were not agglomerated or sintered.

Figure 4:
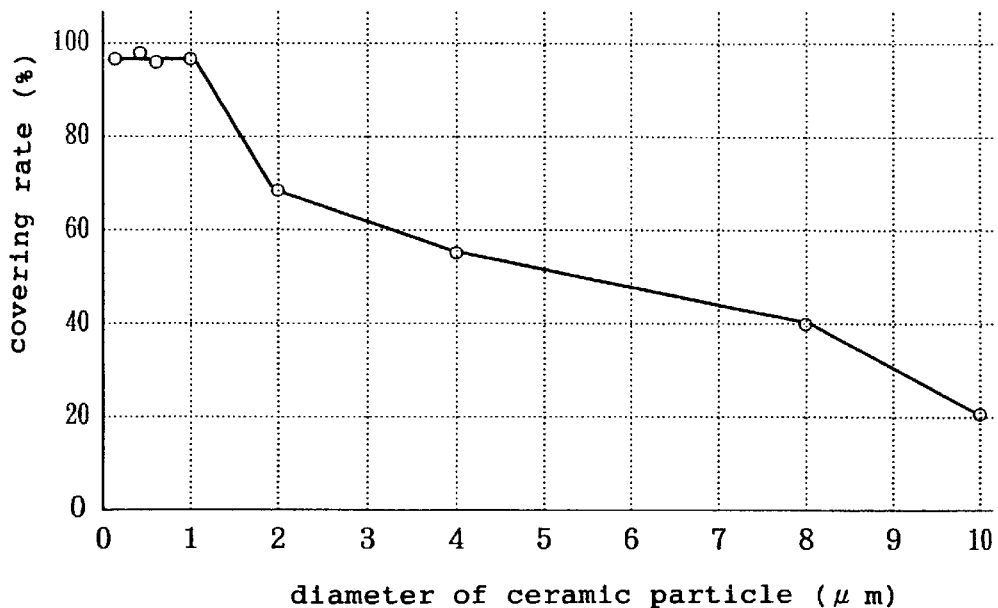
FIG. 4 is a diagram showing relationship between diameter of particulate matter and covering layer in the heat resistant stainless steel wire according to the first embodiment of the present invention.

As shown in FIG. 4, with respect to the ceramic particles for covering the surface of the stainless steel thin wire 2, as the particle diameter is smaller and the particle size is more uniform, the covering layer 10 was the more uniform. It has been found as the result of comparison testing that when the ceramic particles 6 for covering the surface of the stainless steel thin wire 2 exceeds 1 micron, the ceramic particles 6 were hard to be adhered to the stainless steel thin wire 2 and there occurs some portion of the surface of the stainless steel thin wire 2 not covered with particulate matter. It has been further found that when only the Ni—Cr—Al alloy particulates are used as the particulate matter for covering the surface of the stainless steel thin wire 2, the agglutination of the Ni—Cr—Ar alloy particles occurred.

As the result of observation and analysis of the section of the heat resistant stainless steel wire "A" covered with particulate matter according to the present invention, it has been found that, as shown in FIG. 2, a reaction layer 3 between constituent elements of the covered particles 4 and 6 and constituent elements of the stainless steel thin wire 2 appears on the interface between the covered particles 4 and 6 and the stainless steel thin wire 2. This results from the fact that the fine ceramic particles 6 as well as the Ni—Cr—Al alloy particles 4 were reduced by carbon (C) contained in the organic solvent in vacuum and reacted with the stainless steel thin wire 2 as the substrate metal.

For the evaluation of the adhesion between the stainless steel thin wire 2 as the substrate metal and the covering layer 10 or the covered particles 4 and 6 of the heat resistant stainless steel wire "A" according to the present invention, a self-winding test was conducted with respect to one case where the heat resistant stainless steel wire "A" covered with particulate matter was repeatedly heated and the other case where the heat resistant stainless steel wire "A" covered with particulate matter was not heated. It has been found as the result of the test that when the heat resistant stainless steel wire "A" covered with particulate matter was wound and when it was stretched straight after being wound, the covered particles 4 and 6 did not fall off. No cracking of the covering layer 10 and no falling off of the covered particles 4 and 6 result from the fact that the covered particles 4 and 6 and the stainless steel thin wire 2 are bonded together through the reaction layer 3 and the ceramic particles 6 are not bonded to each other but are independent, as a consequence of which thermal stress is relieved.

Figure 5:
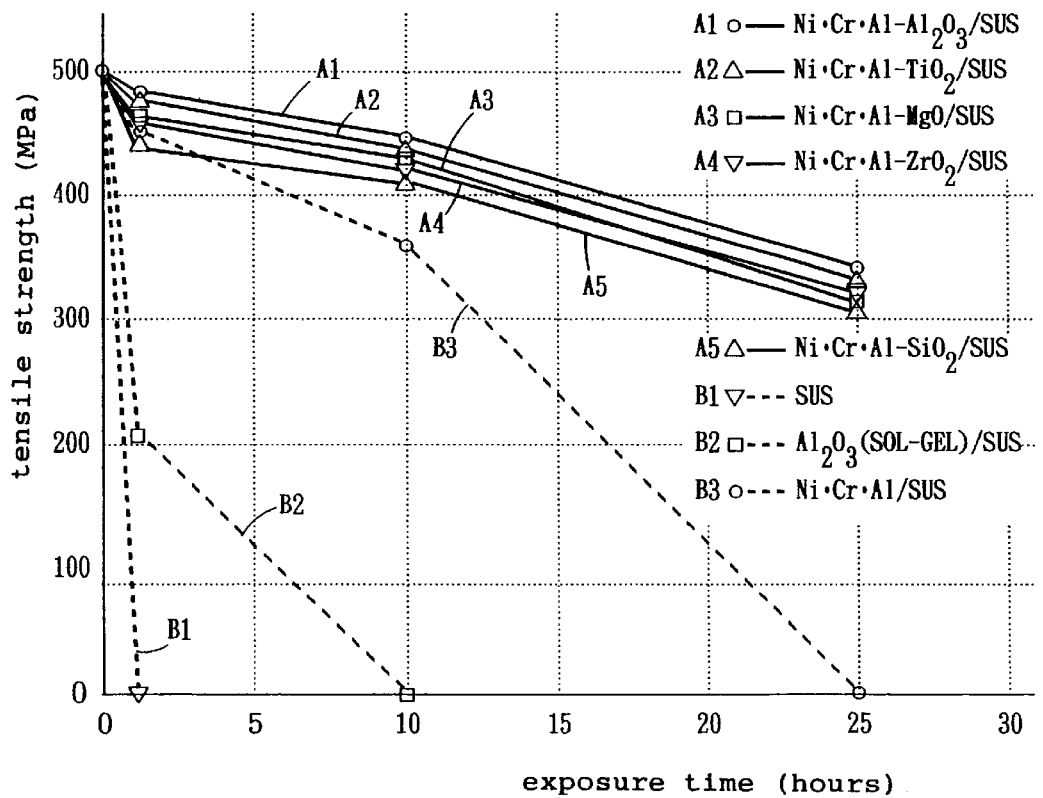
FIG. 5 is a diagram showing a result of heat resistant strength test for the heat resistant stainless steel wire according to the first embodiment of the present invention and Comparative Examples.

Next, for five heat resistant stainless steel wires A1, A5, A3, A4 and A2 covered with particulate matter according to the present invention which use, as the particulate matter, the Ni—Cr—Al alloy particles and the ceramic particles such as $Al_2O_3$, $TiO_2$, MgO, $ZrO_2$, $SiO_2$, $BaTiO_3$, etc., and for three stainless steel thin wires B1 to B3 as Comparative Examples, a heat resistant strength test was conducted to examine the change in strength after they were exposed to the atmosphere at a temperature of 1100° C. for 25 hours. As shown in FIG. 5, the tensile strength of the heat resistant stainless steel wires A1 to A5 according to the present invention was 300 MPa or more. On the other hand, the tensile strength of the uncovered stainless steel thin wire B1, the tensile strength of the stainless steel thin wire B2 covered with $Al_2O_3$ by the Solgel method, and the tensile strength of the stainless steel thin wire B3 covered with only the Ni—Cr—Al alloy could not be measured in one hour of exposure, in 10 hours of exposure, and in 25 hours of exposure, respectively.

With respect to the heat resistant stainless steel wire Al covered with particulate mater in which 5% in weight or more of $Al_2O_3$ particles are added to the Ni—Cr—Al alloy particles, the heat resistant strength test, in which the heat resistant stainless steel wire Al is exposed to the atmosphere at a temperature of 1100° C. for 25 hours, was conducted after which an oxide layer on the surface of the stainless steel thin wire 2 was analyzed. Chromium (Cr) and aluminum (Al) were detected in the oxide layer. On the other hand, iron (Fe) and chrominum (Cr) were detected in an oxide layer on the surface of the stainless steel thin wire B3 using only the Ni—Cr—Al alloy as the particulate matter.

Figure 6:
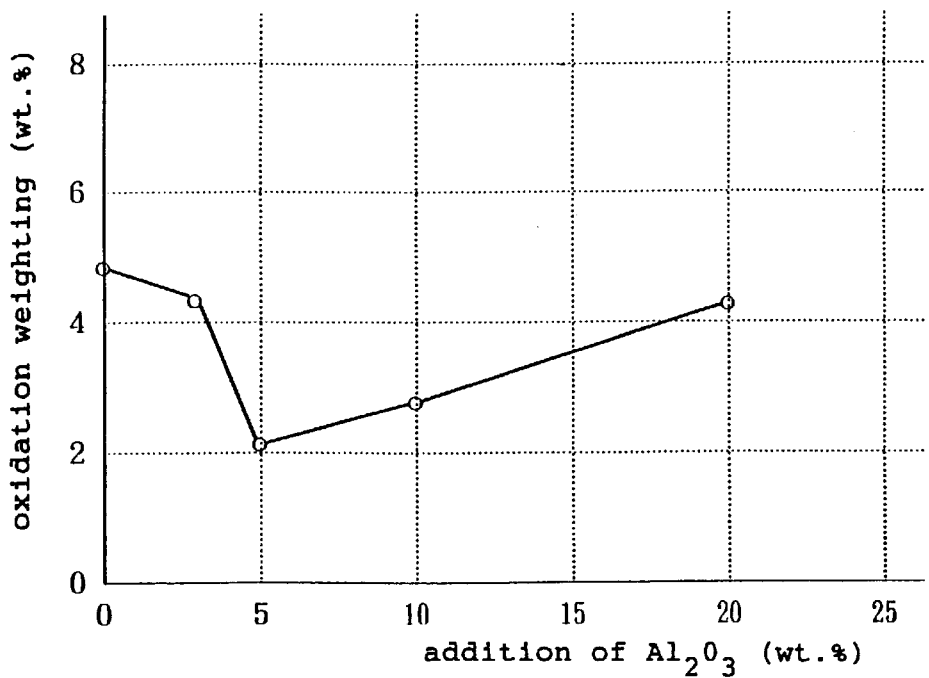
FIG. 6 is a diagram showing relationship between addition of $Al_2O_3$ to the particulate matter and oxidation weighting in the heat resistant stainless steel wire according to the first, embodiment of the present invention.
Figure 7:
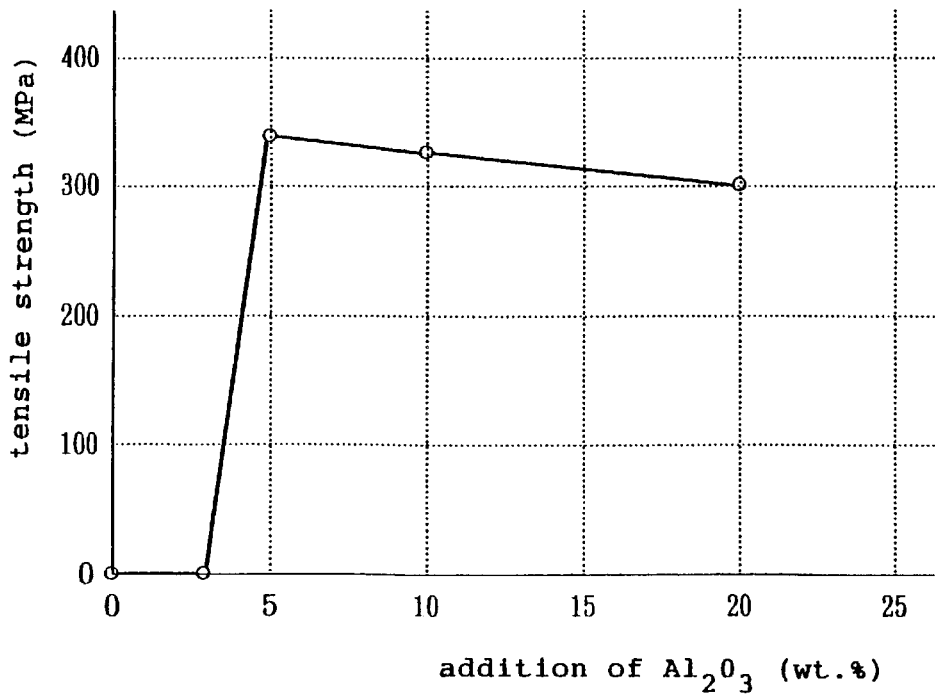
FIG. 7 is a diagram showing relationship between addition of $Al_2O_3$ to the particulate matter and tensile strength in the heat resistant stainless steel wire according to the first embodiment of the present invention.

It has been found by the aforementioned heat resistant strength test that when 5% in weight or more of the $Al_2O_3$ particles were added to the Ni—Cr—Al alloy particles, as the particulate matter for covering the surface of the stainless steel thin wire 2, the oxidation weighting was reduced and the tensile strength after the heat resistant strength test was also improved, as shown in FIGS. 6 and 7. The oxidation weighting PW is represented by PW=100 (W1-W0)/W0 wherein W1 and W0 represent the mass of the heat resistant stainless steel wire before and after the heat resistant strength test respectively. It is considered from the aforementioned analysis and the heat resistant strength test that when the $Al_2O_3$ particles were added to the Ni—Cr—Al alloy particles, as the particulate matter of the covering layer 10, the heat resistant strength is improved because the oxidation of iron (Fe) was suppressed.

It has been found that the specific resistance of the surface of the heat resistant stainless steel wire "A" according to the present invention at an ordinary temperature was approximately 20 MQ-cm, and particularly the specific resistance of the surface of the heat resistant stainless steel wire A3 covered with particulate matter using MgO was approximately 10 MQ-cm even at a temperature of 1000° C.

Figure 3:
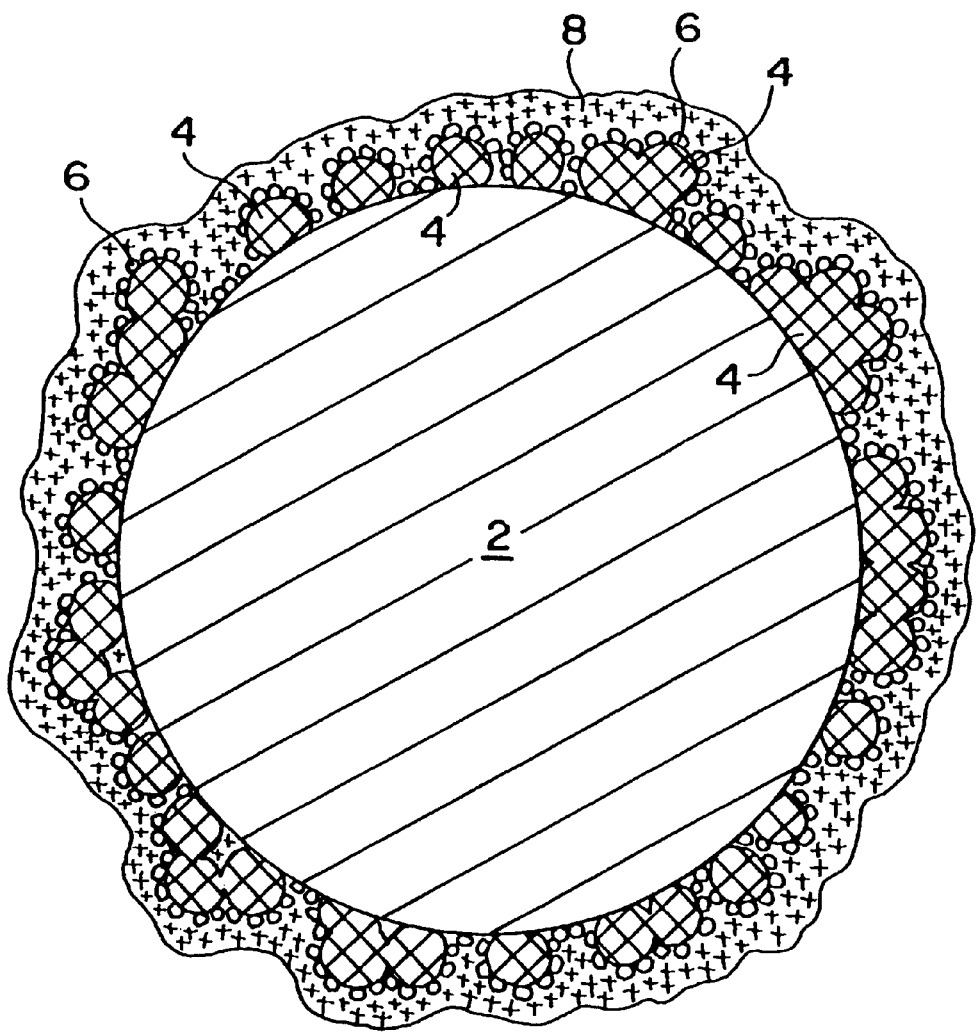
FIG. 3 is a sectional view schematically showing the heat resistant stainless steel, shown in FIG. 1, with a coating.

Next, the solgel coating was applied to the surface of the covering layer 10 of the heat resistant stainless steel wire "A" covered with the Ni—Cr—Al alloy particles 4 and the ceramic particles 6 of $Al_2O_3$, $SiO_2$, MgO, $ZrO_2$, $BaTiO_3$ and $TiO_2$, as the particulate matter, using a coating solution prepared from commercially available metal alkoxide. The conditions of the solgel coating are that the heat resistant stainless steel wire "A" is dipped into the coating solution, is raised therefrom, is subjected to hydrolysis, and then heat-treated in the atmosphere at a temperature of 600° C., as shown in FIG. 3. In the stainless steel thin wire not covered with the particulate matter in the Comparative Example, the coating was peeled off simply, whereas the heat resistant stainless steel wire "A" covered with particulate matter according to the present invention, the coating layer 8 was not peeled off in the case where the thickness thereof is from 1 to 2 micron. This is considered that the contact strength of the coating layer 8 was enhanced due to the anchor effect of the ceramic particles 6 adhered to the surface.

Second Embodiment

A synthetic rubber based adhesive formed from acrylic rubber, an organic solvent, isohexane gas, etc. was coated, by spraying, on the surface of an austenite based stainless steel thin wire (SUS304) 12 (see FIG. 8), having a 0.25 mm of wire diameter. Alloy powder comprising 50% in weight of chromium and 50% in weight of aluminum was adhered to the surface of the synthetic rubber based adhesive and then subjected to heat treatment for about two hours in vacuum at a temperature of 1100° C.

Figure 8:
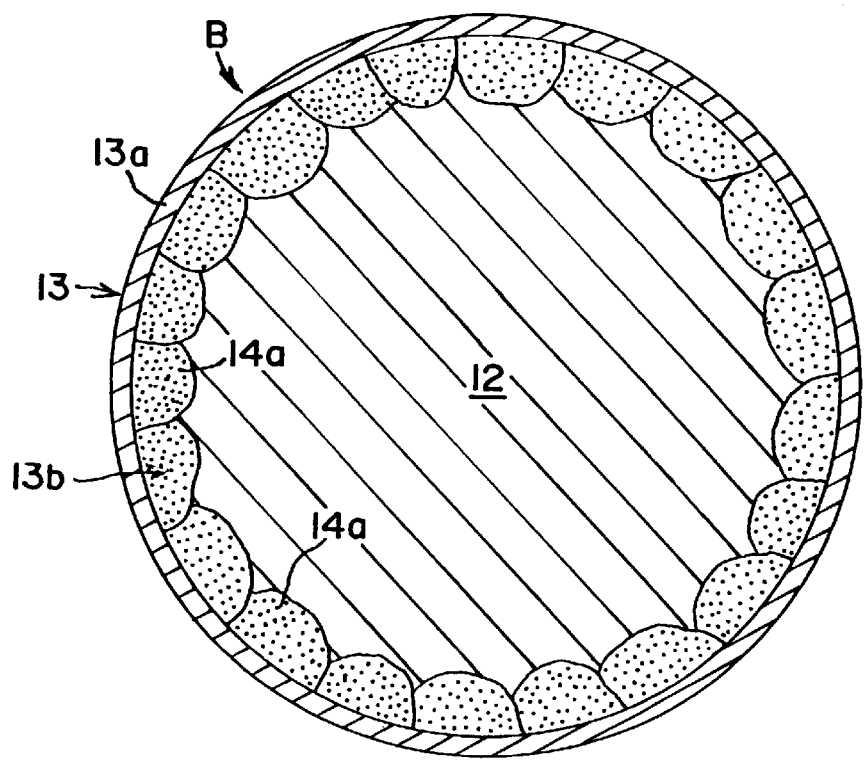
FIG. 8 is a sectional view schematically showing a heat resistant stainless steel wire according to the second embodiment of the present invention.

The section of the heat resistant stainless steel wire "B" according to the present invention, obtained as abovedescribed, was analyzed. As a result, a Fe—Cr—Ni—Al alloy layer 13 having a finely dispersed phase having a thickness 10 to 50 micron was formed on the surface of a stainless stainless thin wire 12, as shown in FIG. 8. It has been found that the alloy layer 13 on the surface of the stainless stainless thin wire 12 is not a single layer but comprises an alloy layer having 10 micron or less of thickness comprising aluminum and an aluminum-iron alloy, that is, a first layer 13a formed on the uppermost surface, and an alloy layer having 20 micron or more of thickness in which an aluminum-iron compound and an aluminum-nickel compound are dispersed in a ferrite base of crystal grains 14a having 10 to 30 micron of particle diameter in the form of a ferrite phase, that is, a second layer 13b formed internally of the first layer 13a. The average crystal particle diameter of the aluminum-iron compound and an aluminum-nickel compound was 1 micron or less. Stainless steel of austenite texture having 20 to 50 micron of average crystal particle diameter is present in a center portion of section of the heat resistant stainless steel wire "B". The second layer 13b of ferrite material is soft as compared with the iron-aluminum alloy of the first layer 13a.

Figure 9:
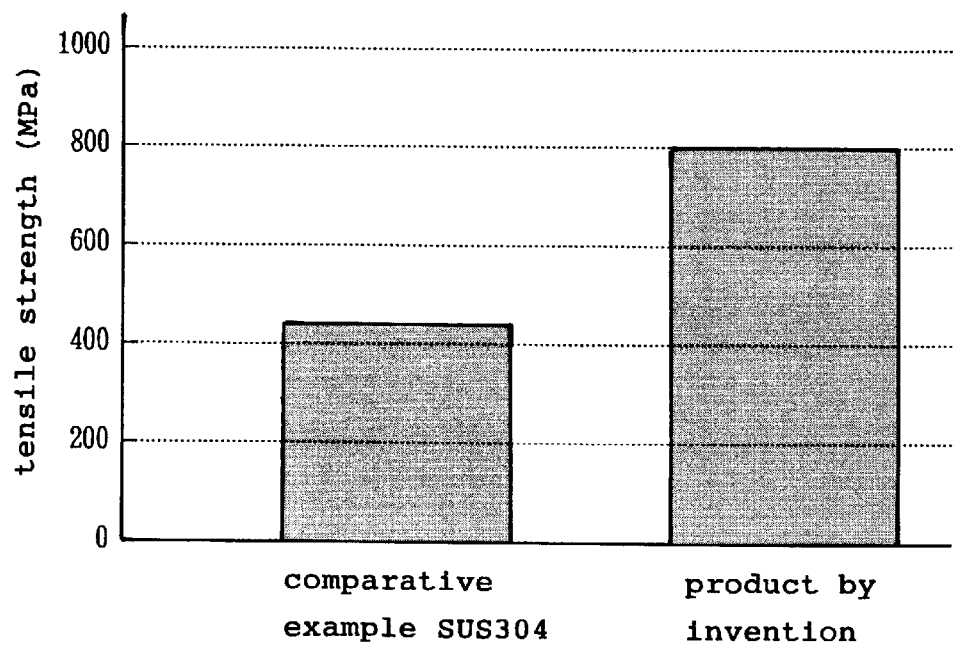
FIG. 9 is a diagram showing heat resistant strength of the heat resistant stainless steel wire according to the second embodiment of the present invention and the comparative example.

The tensile strength of the heat resistant stainless steel wire "B" according to the present invention and the product of Comparative Example was measured. As a result, the tensile strength of the heat resistant stainless steel wire "B" was 800 MPa, as shown in FIG. 9. The strength of a stainless steel wire heat treated without covering alloy powder as the product of Comparative Example (corresponding to the substrate metal of the present invention) was 455 MPa. It is considered that the heat resistant stainless steel wire "B" according to the present invention was improved in strength by exerting a thermal stress resulting from a difference in coefficient of thermal expansion between the second layer 13b formed from an alloy layer of ferrite material on the surface of the stainless steel thin wire 12 and austenite based stainless steel of the stainless steel thin wire 12, or by exerting a residual stress generated between alloy layers in the form of a polycrystal on the surface of the stainless steel thin wire 12.

The heat resistance test to heat the heat resistant stainless steel wire "B" according to the present invention, the stainless steel thin wire formed from SUS304 as the product of Comparative Example, and the stainless steel thin wire formed from FCH2 (Fe—Cr—Al alloy) for 25 hours in the atmosphere at a temperature of 1100° C. As a result, the stainless steel thin wire formed from SUS304 lowers in the tensile strength to a degree being impossible to measure in about one hour of heating; and the tensile strength of the stainless steel wire formed from FCH2 (Fe—Cr—Al alloy) was 417 MPa; whereas the tensile strength of the heat resistant stainless steel wire "B" according to the present invention even after 25 hours of heating was 670 MPa.

Figure 10:
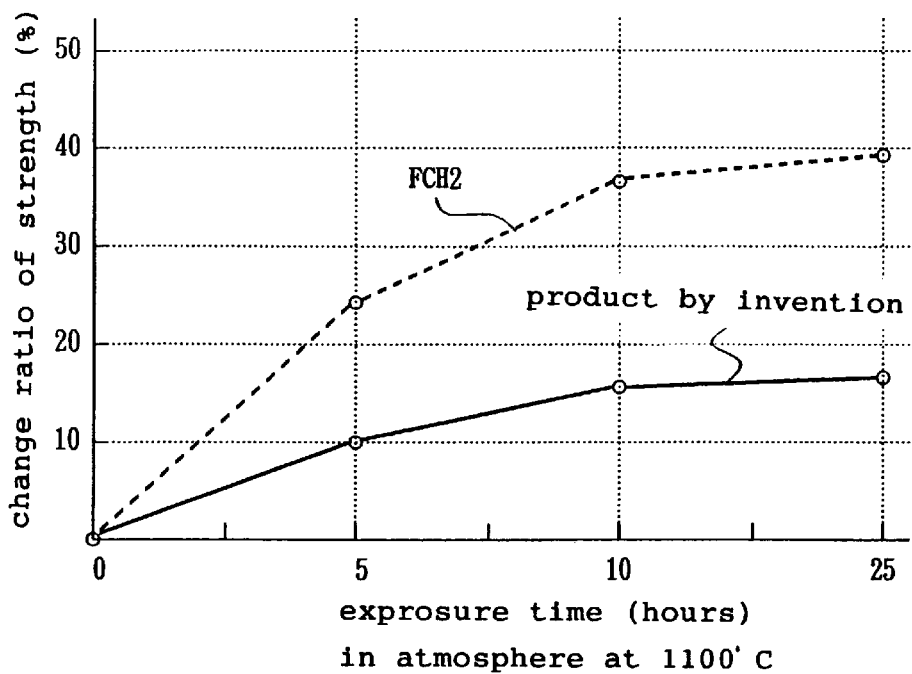
FIG. 10 is a diagram showing heat resistant strength of the heat resistant stainless steel wire according to the second embodiment of the present invention and the comparative example.

FIG. 10 shows the relationship between the exposure time and the change (lowering) rate of the tensile strength with respect to the heat resistant stainless steel wire "B" according to the present invention and the stainless steel thin wire formed from FCH2 (Fe—Cr—Al alloy) of Comparative Example. It is evident that the heat resistant stainless steel wire "B" according to the present invention is extremely smaller in a degree of the strength lowering than the stainless steel thin wire formed from FCH2 (Fe—Cr—Al alloy) of Comparative Example.

The aforementioned heat resistance test was variously conducted varying the diameter of stainless steel thin wire 12 as the substrate metal with respect to the heat resistant stainless steel wire "B" according to the present invention and the stainless steel thin wire formed from FCH2 (Fe—Cr—Al alloy) of Comparative Example. The tensile strength of the heat resistant stainless steel wire "B" according to the present invention in the case where the wire diameter is up to 0.5 mm, is smaller than that of the stainless steel thin wire formed from FCH2 (Fe—Cr—Al alloy) of Comparative Example.

Further, the aforementioned heat resistance test was conducted varying the thickness of the substrate metal with respect to the heat resistant stainless steel strip "B" according to the present invention and the stainless steel thin strip formed from FCH2 (Fe—Cr—Al alloy) of Comparative Example. The tensile strength of the heat resistant stainless steel strip "B" according to the present invention in the case where the thickness is up to 0.5 mm, is smaller than that of the stainless steel thin strip formed from FCH2 (Fe—Cr—Al alloy) of Comparative Example.

The stainless steel thin wire or strip formed from FCH2 (Fe—Cr—Al alloy) of Comparative Example in the case where the diameter of wire or the thickness of strip is 0.2 mm or less is very difficult to subject to plastic working (such as stretching, rolling and bending). On the other hand, the heat resistant stainless steel wire "B" as well as the heat resistant stainless steel strip according to the present invention involves no problem in plastic working (such as stretching, rolling and bending) even if the diameter or the thickness are made smaller by using the stainless steel thin wire or strip having a relatively good processability.

Figure 11:
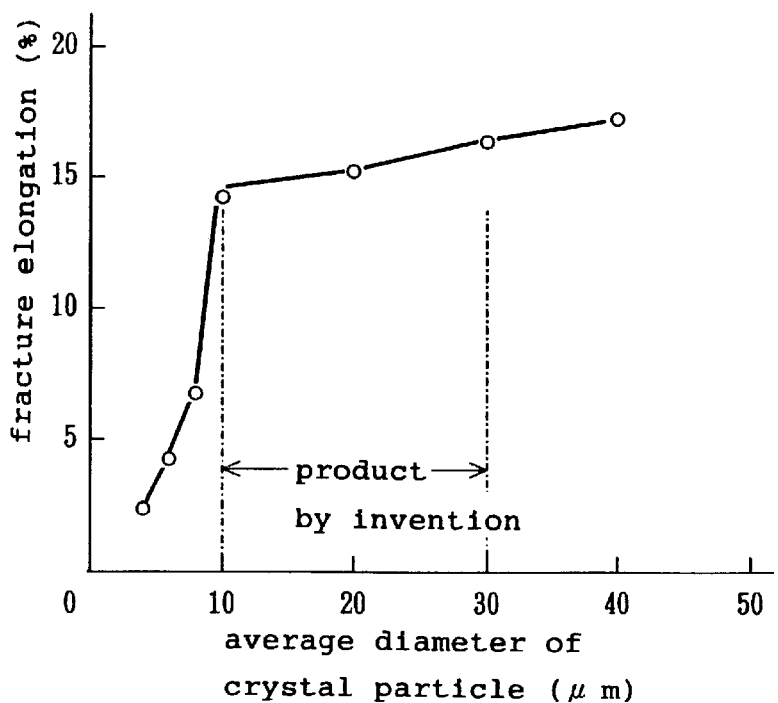
FIG. 11 is a diagram showing relationship between average diameter of crystal particle and fracture elongation of ferrite phase in the second layer in the heat resistant stainless steel wire according to the second embodiment of the present invention.

FIG. 11 shows the relationship between the crystal particle diameter of the ferrite phase in the second layer 13b and the fracture elongation in the heat resistant stainless steel wire "B" according to the present invention. It is understood that when the crystal particle diameter of the second layer 13b exceeds 10 micron, the fracture elongation increases.

Figure 12:
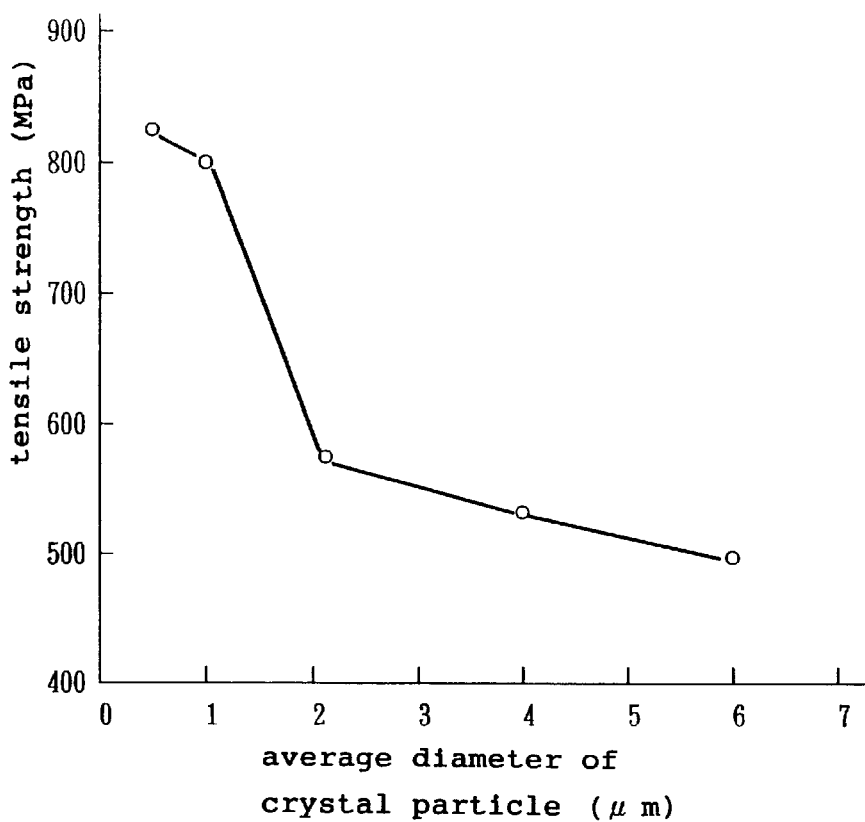
FIG. 12 is a diagram showing relationship between average diameter of crystal particle and tensile strength of the second layer in the heat resistant stainless steel wire according to the second embodiment of the present invention.

FIG. 12 shows the relationship between the crystal particle diameter of the aluminum-iron compound and the aluminum-nickel compound dispersed in the second layer 13b and the tensile strength of the heat resistant stainless steel wire "B". It is understood that when the crystal particle diameter of the compounds dispersed in the second layer 13b is less than 1 micron, the tensile strength is materially enhanced.

When the heat treatment time of the heat resistant stainless steel wire "B" according to the present invention is excessively long, the crystal of the austenite phase of the stainless steel thin wire 12 in the center portion of the heat resistant stainless steel wire "B" grows and the ferrite phase of the second layer 13b dissipates. Suitable heat treatment time is about two hours. Preferably, the first layer 13a is thin because it is brittle. Alumina of the first layer 13a is high in heat resistance to prevent the second layer 13b from being oxidized.

Figure 13:
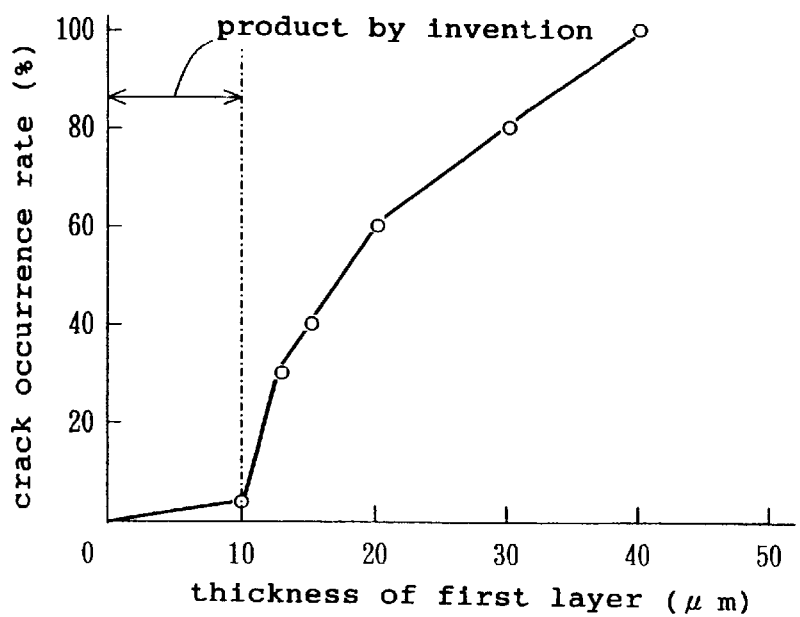
FIG. 13 is a diagram showing relationship between thickness of the first layer and crack occurrence rate in the heat resistant stainless steel wire according to the second embodiment of the present invention.

A plurality of samples which were different in thickness of the first layer 13a formed of a composite phase of aluminum and an aluminum-iron alloy were prepared by variously varying the heat treatment time, for obtaining the heat resistant stainless steel wire "B" according to the present invention. The winding test was conducted with respect to the obtained heat resistant stainless steel wire "B", and then the surface of the heat resistant stainless steel wire "B" was observed. It was found that when the thickness of the first layer 13a exceeds 10 micron, cracks occurred in the first layer 13a, as shown in FIG. 13. Also from viewpoint of this, it is not preferable that the heat treatment time for obtaining the heat resistant stainless steel wire "B" according to the present invention be long.

In the present invention, it is preferable to use the austenite based stainless steel thin wire, as the substrate metal, from which carbide and martensite are hard to be produced during the heat treatment. Particularly, a austenite based stainless steel thin wire having a chemical composition of 0.15% in weight or less of carbon, 15 to 26% in weight of chromium, and 3.5 to 28% in weight of nickel is suitable. When the weight percentage of carbon increases, the carbide of the second layer 13b is precipitated in the grain boundary to promote the brittleness.

Obviously, many modifications and variations of the present invention are possible in light of the above teachings. It is to be understood, therefore, that the invention can be practiced otherwise than as specifically described.

What is claimed is:

1. A heat resistant stainless steel wire for use in an electric heating wire of a glow plug for a Diesel engine, comprising:
   a stainless steel wire containing chromium (Cr); and
   a covering layer covering the surface of said stainless steel wire formed of:
   alloy particles deposited on the stainless steel wire, the alloy particles being either a nickel alloy containing aluminum (Al) ora chromium (Cr) alloy containing aluminum (Al);
   ceramic particles, smaller in size than the alloy particles, non-continuously covering the alloy particles; and
   a fine ceramic coating covering the covering layer, wherein
   said stainless steel wire includes, in addition to chromium (Cr), at least one of nickel (Ni), aluminum (Al) and yttrium (Y),
   the alloy particles of said covering layer are bonded to each other,
   the ceramic particles of said covering layer are independent, without being sintered, and the adhered to the surface of said alloy particles and to said stainless steel wire,
   the ceramic particles of said covering layer contain 6% in weight or more of at least one of aluminum (Al), silicon (Si), magnesium (Mg), zirconium (Zr), barium (Ba) and titanium (Ti), and the ceramic particles of said covering layer have an average particle diameter of 1 micron or less.

2. A heat resistant stainless steel material for use in an electric heating wire of a glow plug for a Diesel engine, comprising:

a substrate formed of an austenite based stainless steel wire containing chromium (Cr) or an austenite based stainless steel strip containing chromium (Cr) disposed in a central portion thereof;

an interior layer formed on said substrate, the interior layer having an aluminum-iron compound and an aluminum-nickel compound dispersed in a ferrite based stainless steel mainly comprising iron-chromium; and an outer layer comprising aluminum and an iron-aluminum alloy, formed on the interior layer, wherein the thickness of said outer layer is 10 microns or less, the average crystal particle diameter of said interior layer is 10 to 30 microns, the crystal particle diameter of the aluminum-iron compound and the aluminum-nickel compound dispersed in said interior layer is 1 micron or less, the composition of the austenite based stainless steel in said substrate comprising 0.15% in weight or less of carbon, 15 to 26% in weight of chromium, and 3.5 to 28% in weight of nickel, and the diameter or thickness of said substrate is 0.5 mm or less.

* * * * *